US006245947B1

(12) United States Patent
Guettes et al.

(10) Patent No.: US 6,245,947 B1
(45) Date of Patent: Jun. 12, 2001

(54) TREATMENT FOR POLYETHER POLYOLS

(75) Inventors: Bernd Guettes, Sallgast; Gerd Hoeppner, Schwarzheide; Monika Wetterling, Senftenberg; Heinz Auer, Neulussheim; Jens Bruhn, Ludwigshafen; Stefan Dinsch, Schipkau; Juergen Winkler, Schwarzheide, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/036,758

(22) Filed: Mar. 9, 1998

(30) Foreign Application Priority Data

Mar. 13, 1997 (DE) .............................. 197 10 443

(51) Int. Cl.[7] .......................... C07C 41/00; C07C 43/00
(52) U.S. Cl. .......................... 568/579; 568/580; 568/583
(58) Field of Search .................. 568/579, 580, 568/583

(56) References Cited

U.S. PATENT DOCUMENTS

| 3,000,963 | 9/1961 | Speranza | 568/579 |
|---|---|---|---|
| 3,016,404 | 1/1962 | Beauchamp et al. | 568/579 |
| 4,251,654 | 2/1981 | Robinson et al. | 568/579 |
| 4,306,943 | 12/1981 | Mori et al. | 568/579 |
| 4,404,121 * | 9/1983 | Klein et al. | 568/579 |
| 4,686,273 * | 8/1987 | Harris | 568/579 |
| 5,282,929 | 2/1994 | Dorai et al. | 568/579 |
| 5,286,761 | 2/1994 | Naujoks et al. | 568/579 |
| 5,288,921 | 2/1994 | Thorpe et al. | 568/579 |
| 5,302,255 | 4/1994 | Dorai et al. | 568/579 |
| 5,373,029 | 12/1994 | Naujoks et al. | 568/579 |
| 5,476,969 | 12/1995 | Hinz et al. | 568/579 |
| 5,552,450 * | 9/1996 | Hinz et al. | 568/579 |
| 5,925,687 | 7/1999 | Guettes et al. | 568/579 |

FOREIGN PATENT DOCUMENTS

| 22 04 515 | 8/1973 | (DE) . |
|---|---|---|
| 142 348 | 6/1980 | (DE) . |
| 216 248 | 6/1983 | (DE) . |
| 0 539 819 | 5/1993 | (EP) . |
| 0539819 | 5/1993 | (EP) . |
| 0 576 132A1 | 12/1993 | (EP) . |
| 0576132 | 12/1993 | (EP) . |
| 0 579 988 | 1/1994 | (EP) . |
| 196 29 160 A1 | 7/1996 | (EP) . |
| 0819712 | 1/1998 | (EP) . |
| WO 93/18083 | 9/1993 | (WO) . |

OTHER PUBLICATIONS

EPO Search Report dated Feb. 17, 2000; Translation of said EPO Search Report.

* cited by examiner

Primary Examiner—Louise N. Leary
(74) Attorney, Agent, or Firm—Fernando A. Borrego

(57) ABSTRACT

A process for treating polyether polyols prepared in a conventional manner by base-catalyzed reaction of H-functional initiator substances with alkylene oxides comprises a combination of a thermal-reactive step at a pH of less than 7 and a temperature above 60° C. and a thermal-distillative step in a countercurrent column using a purifying agent. The polyether polyols prepared according to the invention are used for producing low-fogging and low-odor PUR foams.

20 Claims, No Drawings

TREATMENT FOR POLYETHER POLYOLS

The invention relates to a process for treating polyether polyols prepared in a conventional manner by base-catalyzed reaction of H-functional initiator substances with alkylene oxides and freed from the catalyst and, if appropriate, from salts which are formed, where this treatment is a combination of a thermal-reactive step at a pH of less than 7 and a temperature above 60° C. and a thermal-distillative step in a countercurrent column using a purifying agent.

The preparation of polyether polyols has been known for a long time. Synthesis of polyetherols by anionic polymerization is carried out in particular with the use of alkali metal hydroxides and alkaline-earth metal hydroxides, and at from 60 to 140° C. under increased pressures. After the synthesis, neutralization is carried out using acid, in particular hydrochloric and/or phosphoric acid, in order to remove the catalyst, distillation is carried out, in particular under reduced pressure and at from 80 to 130° C., in order to remove water and other volatile constituents, and finally the salts are removed.

More detail on this topic may be found in Kunststoffhandbuch, Vol. VII, Polyurethane, Carl-Hanser-Verlag, Munich, 1st edition 1966, edited by Dr. R. Vieweg and Dr. A. Höbchtlen, and 2nd edition 1983 and 3rd edition 1993, edited by Dr. G. Oertel.

This preparation process produces, besides the target products, ie. the polyether polyols with various molecular weights, a wide variety of by-products which give various problems in the use of the polyether polyols for preparing polyurethanes (PUR). They may adversely affect the foaming procedure, may give poorer very important physicomechanical values, such as hardness or elasticity, to the foam, and, as a result of lower volatility, may initially remain in the polyurethane and gradually cause disadvantageous odor and fogging.

The odor of PUR foams is problematic in particular for certain applications of flexible PUR foam in the furniture sector and in textile coating. The causes of the odor problem, which derive from the PUR catalysts and the PUR auxiliaries and additives, are removed by changing to higher-boiling, lower-volatility substances with lower vapor pressures and the use of incorporatable catalysts, eg. the spacer amine type of EP-A-0539819. The substances which are derived from the polyols and cause odor may be removed in a manner similar to the removal of cyclic ethers and/or unsaturated polyol constituents, as described in U.S. Pat. No. 4,251,654 and/or EP-A-0576132, by extraction with water or glycols. However, this removes only a very limited proportion of highly volatile substances; other substances transform to give substances having a strong odor only when these conditions are applied (formation and/or cleavage of acetals). The distillation carried out to remove water during the usual purification operation to remove catalyst also eliminates highly volatile constituents, as described, for example, in DD-A-216248. In the case of neutralization and downstream removal of water, continuous changes in pH are caused, giving rise to a wide variety of transformations of the substances causing odor (aldehydes, dioxanes) or, as described and intended in WO-A-9318083, even giving shifts in the molecular weight distribution.

Although important odor-intensive materials are removed in the combined thermal-distillative treatment of polyether polyols described in our U.S. patent application Ser. No. 19629160.7, a large number of by-products is formed continuously in an equilibrium reaction. A purely physical treatment is insufficient to remove them. Distillation processes for preparing low-fogging polyester polyols, as described in EP-A-0579988 for example, operate in a similar manner. Such purely distillative processes are inadequate to remove certain by-products of the polyether polyol preparation, especially since the temperatures which can be used with these polyols are below 150° C. High depletion rates of >95% for by-products affecting quality in polyols have until now been achievable only in complicated apparatus, such as molecular evaporators or extruders, resulting in high investment costs. A better depletion result is also possible with very long residence times in simple apparatus, mixing vessels for example. This, however, gives low yields and unacceptable degradation and discoloration of the product.

It is an object of the present invention to develop a process for post-treatment of polyether polyols from the conventional base-catalyzed reaction of H-functional initiator substances with alkylene oxides and subsequent purification of the raw polyether polyols for catalyst removal, which process permits high depletion rates of the by-products affecting quality and, with less expensive apparatus, permits high yields with complete avoidance of discoloration and degradation of the product. We have found that this object is achieved by subjecting the polyether polyols to a treatment which is a combination of a thermal-reactive step at a pH of less than 7 and a temperature above 60° C. and a thermal-distillative step in a countercurrent column using a purifying agent.

The invention therefore provides a process for treating polyether polyols prepared in a conventional manner by base-catalyzed reaction of H-functional initiator substances with alkylene oxides, wherein the treatment is a combination of a thermal-reactive step at a pH of less than 7 and a temperature above 60° C. and a thermal-distillative step in a countercurrent column using a purifying agent.

The invention also provides the use of the polyether polyols prepared according to the invention for producing low-fogging and low-odor PUR foams.

The novel process may be used for treating any polyether polyol prepared by base-catalyzed addition of alkylene oxide to an H-functional initiator substance.

Such products are prepared by the processes known from the prior art, by mixing the H—, in particular OH— and/or NH— and/or $NH_2$-functional initiator substance with the base used as catalyst in an amount of from 0.05 to 1% by weight, removing the resultant water and then metering in and reacting the low-molecular-weight alkylene oxide, in particular ethylene oxide and/or propylene oxide.

The OH-functional initiator substances are usually polyfunctional, in particular bi- and/or trifunctional, compounds, such as glycols, for example ethylene glycol and propylene glycol, glycerol and trimethylolpropane, but also higher-functionality alcohols and sugar alcohols, such as glucose or saccharides. The use of glycerol and/or trimethylolpropane individually or in combination with proportions of glycols is particularly advantageous.

The NH— or $NH_2$-functional compounds may be either aliphatic or aromatic mono- or polyfunctional primary or secondary amines. Water may also be used as initiator substance. Mixtures of the abovementioned compounds are frequently used as initiators.

In particular when initiator substances are used which are highly viscous or solid at the reaction temperature, liquid coinitiators are used to permit a homogeneous initiation of the reaction. This applies to sugars, such as sorbitol or sucrose, but also to aromatic amines, such as tolylenediamine or methyldiphenyldiamine and their homologs. Glycols, glycerol and water are in particular used as coinitiators here.

After adding the alkaline catalyst and, if appropriate, after removing the resultant water, the alkylene oxides are metered in. For reasons of safety, inert conditions are created in advance within the reaction vessel using inert gas, in particular nitrogen.

Low-molecular-weight alkylene oxides used are in particular ethylene oxide (EO), propylene oxide (PO) and/or butylene oxide (BO), preferably EO and 1,2-PO.

The catalysts used are basic compounds, in particular alkali metal hydroxides and/or alkaline-earth metal hydroxides and/or amines. The alkylene oxides are added on individually as blocks and/or as random mixture.

The reaction carried out under the conventional reaction conditions, in particular at from 60 to 140° C. and at atmospheric pressure or at a pressure of up to 1.0 MPa.

In the usual manner, the polyether polyol prepared in this way is then purified from the catalyst, for example by ion-exchange, sorption or acid-neutralization processes, and, if desired is freed, by filtration for example, from salts which have formed.

The novel treatment of the polyether polyols prepared and purified in this way is a combination of a thermal-reactive step at a pH of less than 7 and a temperature above 60° C. and a thermal-distillative step in a countercurrent column using a purifying agent.

In the thermal-reactive treatment step, the pH is lowered to less than 7, preferably to less than 6, and particularly preferably to less than 5.5, by adding acids and/or acid substances. Examples of acids and/or acid substances are formic acid, acetic acid, phosphoric acid, sulfuric acid, hydrochloric acid and oxalic acid. Phosphoric acid and hydrochloric acid are particularly preferred. It is advantageous to use the acid used in freeing the respective raw polyetherol from the base used as catalyst.

The thermal-reactive treatment step may be carried out in the presence of sorbents, in particular acidic sorbents, examples being the abovementioned acids.

According to the invention, the reaction is carried out at above 60° C., preferably at above 90° C., and particularly preferably at above 100° C.

This thermal-reactive treatment step prevents the by-products formed from transforming to give substances with stronger odor and higher boiling points (and therefore initially remaining in the PUR as a result of lower volatility and gradually causing disadvantageous odor and fogging) and/or breaks down substances which have high boiling points.

There then follows directly the specific thermal-distillative treatment step, carried out in a countercurrent column using a purifying agent.

The column to be used according to the invention operates with a countercurrent using a purifying agent, preferably at gas velocities of from 0.1 to 2 m/s and a liquid load of from 1 to 10 $m^3/(m^2 \cdot h)$. The column has a specific surface area of from 300 to 1000 $m^2/m^3$.

The liquid and/or gaseous purifying agents used have a high degree of insolubility in the polyether polyol and a high vapor pressure at the operating temperature of the column during the treatment step. Nitrogen and/or $CO_2$ are particularly suitable. The pressure of the purifying agent entering the area of reduced pressure is preferably reduced by a nozzle. The nozzle is advantageously designed so that a good immediate distribution of the purifying agent over the entire cross section of the column is ensured.

The treatment may be operated continuously or discontinuously and is preferably carried out at from 100 to 150° C., at a column head pressure of from 1 to 50 mbar and with a pressure drop through the column of less than 1 mbar.

The combined post-treatment is carried out in particular after the raw polyetherol has been freed from the catalyst, before or after a filtration to remove solid constituents. If it is carried out before the usual removal of the salts, a further filtration may follow, if appropriate.

The novel combined treatment may be complemented, if desired, by an extractive and/or sorptive treatment with solid sorbents and/or with extractants.

The novel process has the advantage that, by means of the specific thermal-reactive and thermal-distillative treatment of the polyether polyols, not only the usual removable by-products but also very high-boiling constituents, such as cyclic acetals, aldehydes, ketones and/or their derivatives, during their formation and/or transformation, may be to some extent broken down, to some extent transformed into compounds of low boiling point, and are then easy to remove. The distillative treatment is carried out in a very simple column, but the reactive treatment combined with this and the operating conditions of the column which are designed precisely for the breakdown and transformation products which are produced in the procedure make a depletion rate of >95% possible, and essentially non-fogging, odorless polyether polyols are produced which can be converted into low-fogging and low-odor PUR foams. Discoloration and degradation of the product do not occur in the novel process. The process may be used on any type of polyether polyol.

The low-fogging and low-odor PUR foams are produced in a conventional manner by reacting the polyether polyols treated according to the invention, if desired in a mixture with other higher-molecular-weight compounds having at least two reactive hydrogen atoms, with organic and/or modified organic polyisocyanates and, if desired, low-molecular-weight chain extenders and/or crosslinking agents, in the presence of blowing agents, catalysts and, if desired, other auxiliaries and/or additives.

An overview of starting materials which can be used and the production and use of PUR foams can be found in the technical literature, for example in the monograph of J. H. Saunders and K. C. Frisch, High Polymers, Vol. XVI, Polyurethanes, Part 1 and 2, Interscience Publishers, 1962 and 1964 or Kunststoffhandbuch, Polyurethane, Vol. VII, Carl-Hanser-Verlag, Munich, Vienna, 1st, 2nd and 3rd edition, 1966, 1983 and 1993, or appropriate patent specifications.

The invention is described in further detail in the following working examples:

COMPARATIVE EXAMPLE 1

1000 kg of a polyether polyol, prepared from 23 kg of glycerol, 882 kg of PO and 95 kg of EO, having an OH number of 50 mg KOH/g, a total alkalinity of 0.3% KOH, a viscosity of 600 mPas and a content of by-products affecting quality of 400 ppm, were subjected to a conventional purification with $H_3PO_4$ (addition of 2% by weight of $H_2O$ and 5.25 kg of $H_3PO_4$, distillation for 0.5 h at 80° C. and filtration for removal of water and salts in a short-path evaporator under nitrogen at 110° C.).

The polyether polyol purified in this way still contained 348 ppm of by-products and had a very strong odor. Flexible PUR foams produced therefrom caused fogging and a strong odor which did not improve even after storage.

Working Example 1

1000 kg of a polyether polyol according to Comparative Example 1 were mixed, after the distillation and filtration described, with a further 0.25 kg of $H_3PO_4$. The product, with pH 5.7, was heated to 125° C. and stirred for 1 h. The polyether polyol was then given a distillative treatment in a column with the following parameters:

| | |
|---|---|
| Specific surface area | 500 $m^2/m^3$ |
| Temperature | 100–150° C. |
| Pressure | 25 mbar |
| Pressure drop | <1 mbar |
| Purifying agent | $N_2$ |
| Gas velocity | 1.2 m/s |
| Liquid load | 8 $m^3/(m^2 \cdot h)$ |

After the treatment, the polyether polyol contained 15 ppm of by-products, was colorless and had a pleasant odor typical of the product. No additional by-products had formed.

COMPARATIVE EXAMPLE 2

1000 kg of a polyether polyol, prepared from 23 kg of glycerol, 882 kg of PO and 95 kg of EO, having an OH number of 50 mg KOH/g, a total alkalinity of 0.3% KOH, a viscosity of 600 mPas and a content of by-products affecting quality of 400 ppm, were subjected to a conventional purification with HCl (addition of 2% by weight of $H_2O$ and 6.8 kg of HCl, distillation for 0.5 h at 80° C. and filtration for removal of water and salts in a short-path evaporator under nitrogen at 110° C.).

The polyether polyol purified in this way still contained 300 ppm of by-products and had a very strong odor. Flexible PUR foams produced therefrom caused fogging and a strong odor which did not improve even after storage.

Working Example 2

1000 kg of a polyether polyol according to Comparative Example 2 were mixed, after the distillation and filtration described, with a further 0.6 kg of HCl. The product, with pH 3.8, was heated to 125° C. and stirred for 1 h. The polyether polyol was then given a distillative treatment in a column with the following parameters:

| | |
|---|---|
| Specific surface area | 500 $m^2/m^3$ |
| Temperature | 100–150° C. |
| Pressure | 25 mbar |
| Pressure drop | <1 mbar |
| Purifying agent | $N_2$ |
| Gas velocity | 1.2 m/s |
| Liquid load | 8 $m^3/(m^2 \cdot h)$ |

After the treatment, the polyether polyol contained 8 ppm of by-products, was colorless and had a pleasant odor typical of the product. No additional by-products had formed.

COMPARATIVE EXAMPLE 3

1000 kg of a polyether polyol, prepared from 23 kg of glycerol and 977 kg of PO, having an OH number of 35 mg KOH/g, a total alkalinity of 0.2% KOH, a viscosity of 3200 mPas and a content of by-products affecting quality of 800 ppm, were subjected to a 45 conventional purification with $H_2SO_4$ (addition of 2% by weight of $H_2O$ and 2.2 kg of $H_2SO_4$, distillation for 0.5 h at 80° C. and filtration for removal of water and salts in a short-path evaporator under nitrogen at 110° C.).

The polyether polyol purified in this way still contained 450 ppm of by-products and had a very strong odor. Flexible PUR foams produced therefrom caused fogging and a strong odor which did not improve even after storage.

Working Example 3

1000 kg of a polyether polyol according to Comparative Example 3 were mixed, after the distillation and filtration described, with a further 0.2 kg of $H_2SO_4$. The product, with pH 4.2, was heated to 125° C. and stirred for 1 h. The polyether polyol was then given a distillative treatment in a column with the following parameters:

| | |
|---|---|
| Specific surface area | 500 $m^2/m^3$ |
| Temperature | 100–150° C. |
| Pressure | 25 mbar |
| Pressure drop | <1 mbar |
| Purifying agent | $N_2$ |
| Gas velocity | 1.2 m/s |
| Liquid load | 8 $m^3/(m^2 \cdot h)$ |

After the treatment, the polyether polyol contained 15 ppm of by-products, was colorless and had a pleasant odor typical of the product. No additional by-products had formed.

We claim:

1. The process for producing polyether polyols comprising:
   producing polyether polyols by a base-catalyzed reaction of H-functional initiator substances with alkylene oxides and freed from the catalyst and, if present, from salts which are formed, and
   treating said polyether polyols by a thermal-reactive step at a pH of less than 7 and a temperature above 60° C. and a thermal-distillative step in a countercurrent column using a purifying agent.

2. The process as claimed in claim 1, wherein the thermal-reactive treatment step is carried out at a pH of less than 6.

3. The process as claimed in claim 1, wherein the pH is lowered by adding acids and/or acid substances.

4. The process as claimed in claim 1, wherein the thermal-reactive treatment step is carried out in the presence of acidic sorbents.

5. The process as claimed in claim 1, wherein, in the thermal-reactive treatment step, the temperature is increased to above 90° C.

6. The process as claimed in claim 1, wherein the thermal-distillative treatment step is carried out in countercurrent in a column using a purifying agent at gas velocities of from 0.1 to 2 m/s and a liquid load of from 1 to 10 $m^3/(m^2 \cdot h)$.

7. The process as claimed in claim 1, wherein liquid and/or gaseous purifying agents are used which have a high degree of insolubility in the polyether polyol and a high vapor pressure at the operating temperature of the column during the treatment step.

8. The process as claimed in claim 1, wherein nitrogen and/or $CO_2$ are used as purifying agents.

9. The process as claimed in claim 1, wherein the thermal-distillative treatment is carried out in a column having a specific surface area of from 300 to 1000 $m^2/m^3$ at from 100 to 150° C., at a column head pressure of from 1 to 50 mbar and with a pressure drop through the column of less than 1 mbar.

10. Polyether polyols prepared according to the process of claim 1 which can be used to produce low-fogging and low-odor polyurethane foams.

11. Polyether polyols comprising:
    a base-catalyzed reaction product of H-functional initiator substances with alkylene oxides, said product freed from the catalyst and, if present, from salts which are formed, wherein said product is treated by a thermal-reactive step at a pH of less than 7 and a temperature above 60° C. and a thermal-distillative step in a countercurrent column using a purifying agent.

12. Polyether polyols as claimed in claim 11, wherein said thermal-reactive step is carried out a pH of less than 6.

13. Polyether polyols as claimed in claim 11, wherein the pH is lowered by adding acids and/or acid substances.

14. Polyether polyols as claimed in claim 11, wherein the thermal-reactive step is carried out in the presence of acidic sorbents.

15. Polyether polyols as claimed in claim 11, wherein in the thermal-reactive step the temperature is increased to above 90° C.

16. Polyether polyols as claimed in claim 11, wherein the thermal-distillative step is carried out countercurrently in a column using a purifying agent at gas velocities of from 0.1 to 2 m/s and a liquid load of from 1 to 10 $m^3/(m^2 \cdot h)$.

17. Polyether polyols as claimed in claim 11, wherein liquid and/or gaseous purifying agents are used which have a high degree of insolubility in the product and a high vapor pressure at the operating temperature of the column during the treatment of the product.

18. Polyether polyols as claimed in claim 11, wherein nitrogen and/or $CO_2$ are used as a purifying agents.

19. Polyether polyols as claimed in claim 11, wherein the thermal-distillative step is carried out in a column having a specific surface area of from 300 to 1000 $m^2/m^3$ at from 100 to 150° C., at a column head pressure of from 1 to 50 mbar and with a pressure drop through the column of less than 1 mbar.

20. The process for producing polyether polyols comprising the steps of:

reacting H-functional initiator substances with alkylene oxides to produce a polyether polyol composition removing catalyst and, if present, salts which are formed from the composition to provide polyether polyols, and subjecting said polyether polyols to a thermal-reactive step at a pH of less than 7 and a temperature above 60° C. and a thermal-distillative step in a countercurrent column using a purifying agent.

\* \* \* \* \*